(12) United States Patent
Bang et al.

(10) Patent No.: US 9,068,744 B2
(45) Date of Patent: Jun. 30, 2015

(54) ENERGY CONVERSION SYSTEM

(71) Applicants: William Hunkyun Bang, Seoul (KR); Thomas Anthony Patti Paternostro, Stockton, CA (US)

(72) Inventors: William Hunkyun Bang, Seoul (KR); Thomas Anthony Patti Paternostro, Stockton, CA (US)

( * ) Notice: Subject to any disclaimer, the term of this patent is extended or adjusted under 35 U.S.C. 154(b) by 0 days.

(21) Appl. No.: 14/306,053

(22) Filed: Jun. 16, 2014

(65) Prior Publication Data

US 2014/0290541 A1 Oct. 2, 2014

Related U.S. Application Data

(60) Division of application No. 13/572,663, filed on Aug. 12, 2012, now Pat. No. 8,833,276, which is a continuation-in-part of application No. 12/367,462, filed on Feb. 6, 2009, now Pat. No. 8,240,258.

(51) Int. Cl.
| | |
|---|---|
| *F23G 7/00* | (2006.01) |
| *F23G 5/00* | (2006.01) |
| *F23K 3/00* | (2006.01) |
| *F23G 5/44* | (2006.01) |
| *F23G 5/16* | (2006.01) |
| *F23G 5/50* | (2006.01) |
| *F23G 7/12* | (2006.01) |
| *F23M 9/00* | (2006.01) |
| *F23M 9/06* | (2006.01) |
| *F23G 5/38* | (2006.01) |
| *F23G 5/46* | (2006.01) |
| *F23L 15/00* | (2006.01) |
| *F23G 5/12* | (2006.01) |

(52) U.S. Cl.
CPC ........... *F23G 5/444* (2013.01); *F23K 2203/202* (2013.01); *F23G 5/16* (2013.01); *F23G 5/50* (2013.01); *F23G 7/12* (2013.01); *F23G 2205/121* (2013.01); *F23G 2207/20* (2013.01); *F23M 9/003* (2013.01); *F23M 9/06* (2013.01); *Y02E 20/12* (2013.01); *F23G 2206/203* (2013.01); *F23G 5/38* (2013.01); *F23G 5/46* (2013.01); *F23L 15/00* (2013.01); *F23G 5/12* (2013.01); *F23G 2209/28* (2013.01); *F23G 2900/508* (2013.01)

(58) Field of Classification Search
CPC ............... F23B 1/08; F23B 1/12; F23B 1/34; F23B 1/36; F23B 10/00; F23B 10/02; F23B 30/02; F23B 30/04; F23B 80/04; F23G 7/12; F23G 2202/10; F23G 2202/103; F23G 2203/8013; F23G 2205/121; F23G 2209/28; F23G 2900/50001
USPC ......... 110/110, 225, 226, 227, 228, 235, 246, 110/229, 230, 255, 256, 276, 295, 327, 346
See application file for complete search history.

(56) References Cited

U.S. PATENT DOCUMENTS

| | | | | |
|---|---|---|---|---|
| 3,020,212 | A * | 2/1962 | Lantz | 202/118 |
| 4,802,288 | A * | 2/1989 | Shinn et al. | 34/136 |
| 5,338,188 | A * | 8/1994 | Yocum | 432/114 |
| 5,382,002 | A * | 1/1995 | Evans et al. | 266/205 |
| 5,644,997 | A * | 7/1997 | Martin et al. | 110/246 |
| 6,105,275 | A * | 8/2000 | Aulbaugh et al. | 34/424 |
| 6,249,988 | B1 * | 6/2001 | Duske et al. | 34/62 |
| 8,240,258 | B2 * | 8/2012 | Bang et al. | 110/276 |

* cited by examiner

*Primary Examiner* — David J Laux
(74) *Attorney, Agent, or Firm* — Chanmin Park

(57) ABSTRACT

An energy conversion system comprises a plurality of concentrically arranged combustion chambers for passing incinerated waste plastic fuel along a generally S-shaped combustion path into a discharge section for thermally coupling the incinerated waste plastic fuel to a fluid material to facilitate an energy conversion process. The combustion chambers are arranged concentrically around a single rotatable feed mechanism and the combustion chambers are in fluid communication with one another. The fluid material is contained within a boiler in fluid communication with the combustion chambers for heating the fluid material to facilitate the energy conversion process.

8 Claims, 12 Drawing Sheets

ENERGY CONVERSION SYSTEM

CROSS-REFERENCE TO RELATED APPLICATION

This application is a divisional application based on Ser. No. 13/572,663, filed on Aug. 12, 2012, which is a continuation-in-part application based on Ser. No. 12/367,462, filed on Feb. 6, 2009, now U.S. Pat. No. 8,240,258. The disclosure of the base applications are incorporated by reference herein.

BACKGROUND OF THE INVENTION

The present invention relates generally to fuel burners, especially burners for waste fuel, such as waste plastic. Considerable research effort has been invested toward finding methods of converting waste plastics to usable fuels as a means of plastic recycling. Waste plastics are burned to generate heat, which may be used for water heating, industrial heat, or other purposes. Important considerations related to waste plastics as fuel sources are: maximizing energy by burning the solid fuel completely, minimizing heat losses to the environment, compactness of the burner, and minimizing soot and harmful gases emission.

Some existing waste fuel burners have multiple combustion chambers, which improve the completeness of the burning, but the combustion chambers are arranged one after another, therefore resulting in a long burner and significant heat losses due to the exposed outer surfaces.

Other existing waste fuel burners accumulate ash, soil, and sand during the burning process. These burners have to be periodically stopped for the removal of accumulated non-combustible material.

There is therefore a need for solid waste burners that minimize burner size and heat losses, while maximizing the completeness of fuel burning. The burner should also minimize soot and harmful gases emission, while reducing the accumulation of the non-combustible material inside the burner.

BRIEF SUMMARY OF THE INVENTION

The present invention relates generally to burners that use solid fuels, especially waste plastic fuels. Burner size is minimized by having multiple combustion chambers arranged concentrically around a rotating screw conveyor. Heat efficiency is improved by having an air chamber disposed around the combustion chambers, because the air for the combustion is preheated prior to being delivered to the combustion chambers, while the air chamber at the same time thermally insulates the combustion chambers against the environment. Waste plastic is transported from a fuel hopper to the combustion chambers by a rotating screw conveyor having spiraling auger blades. Speed of the screw conveyor rotation controls the consumption of waste plastic and, hence, the amount of thermal energy generated in the burner. Parts of the combustion chambers can also rotate to auger waste plastic for better oxidation, therefore enhancing the combustion process.

In one embodiment, a burner system for waste fuel, comprises 1) a combustion unit having a plurality of combustion chambers arranged concentrically around a single rotatable feed mechanism, wherein the individual ones of said combustion chambers are in fluid communication with one another; 2) an air chamber surrounding the plurality of combustion chambers facilitates preheating combustion air delivered to the plurality of combustion chambers and further facilitates insulating said plurality of combustion chambers against thermal losses to the environment; and 3) a discharge chamber in fluid communication with the plurality of combustion chambers and a 4) boiler for heating water and/or oil to facilitate an energy conversion process.

In one aspect of the above described embodiment, the single rotatable feed mechanism is a variable speed conveyor screw for directing the waste fuels along a fuel consumption path through the individual ones of said plurality of combustion chambers; wherein the plurality of combustion chambers include a first combustion chamber, a second combustion chamber, and a third combustion chamber; wherein the plurality of combustion chambers are arranged radially one after another so that the combustion unit has an overall axial length in the direction of said variable speed conveyor screw; and wherein said variable speed conveyor screw has a longitudinal length that is about equal to a longitudinal length of an individual one the combustion chambers in the plurality of combustion chambers.

In another embodiment of the present invention, a burner system for waste fuels comprises 1) a rotatable feed mechanism for directing the waste fuel to a combustion unit; the combustion unit having first, second and third combustion chambers in fluid communication with one another and substantially coaxially arranged with respect to the rotatable feed mechanism; wherein the first combustion chamber being arranged to receive the waste fuel from the feed mechanism; an outlet for discharging exhaust materials from the third combustion chamber; wherein the combustion chambers have approximately like axial extents and wherein the first through third combustion chambers are arranged radially one after the other so that the combustion unit has an overall axial length in the direction of the feed conveyor approximately equal to the length of an individual combustion chamber.

In one aspect of this another embodiment, the burner system includes a combustion air inlet orifice for each combustion chamber arranged upstream of the respective combustion chambers.

In another aspect of the present invention, each combustion chamber is radially spaced apart from the other combustion chambers by inner and outer tubular walls.

In still yet another aspect of the present invention each combustion chamber is defined in part by a tubular wall that is common to two combustion chambers.

In yet another aspect of the present invention, the burner system includes radially oriented end walls arranged between adjacent combustion chambers and spaced apart from respective ends of the tubular walls for generating an S-shaped flow of combustible materials, combustion air, smoke and particulates from the first through the third combustion chambers.

In another aspect of the present invention, at least one of the end walls is rotatably fixed to the feed mechanism for rotation with the feed mechanism.

In yet another aspect of the present invention the burner system includes auger blades fixed to the tubular walls for rotation therewith for advancing the combustible materials and products of combustion through the combustion unit.

In yet another aspect of the present invention the burner system includes auger blades fixed to the tubular walls for rotation therewith for advancing the combustible materials and products of combustion through the combustion unit.

In another aspect of the present invention the burner system includes orifices located in the housing and communicating with the air flow passage of the housing for directing combustion air from the air flow passage in the housing to upstream ends of the combustion chambers.

In one aspect of the present invention, the feed mechanism of the burner system includes a screw conveyor having a hollow interior extending axially along the conveyor and into the combustion unit for directing combustion air to the combustion unit, and one or more orifices disposed radially from the hollow interior and axially located on the screw conveyor so that the orifices discharge air to at least one combustion chamber.

In yet another aspect of the present invention, the burner system includes discharge blades attached with the feed mechanism for swirling combustion gases and flushing non-combustible material out of the burner system.

In still yet another aspect of the present invention, the burner system includes an auxiliary burner configured to start burning of the waste fuel.

In yet another aspect of the present invention, the auxiliary burner of the burner system is selected from a group consisting of an oil burner, a gas burner, a solid fuel burner, an electrical burner and combinations thereof.

In another aspect of the present invention, the burner system includes a fuel hopper configured to provide waste fuel to the feed mechanism.

In one aspect of the present invention, the fuel hopper comprises a rotator configured to rotate substantially inside a rotator housing, the rotator further comprising a plurality of rotator protrusions inclined opposite from the direction of the rotator's rotation, thus reducing the incidence of waste fuel sticking to a rotator housing as waste fuel approaches the feed mechanism.

In yet another aspect of the present invention, the rotator protrusions of the burner system have substantially triangular shape.

In still yet another aspect of the present invention, the rotator protrusions of the burner system have substantially semicircular shape.

In yet another embodiment of the present invention, a burner system for consumption of waste fuel, comprises 1) a screw conveyor configured to revolve around its longitudinal axis, the screw conveyor having a longitudinal hollow interior for air distribution and a plurality of radially disposed air intake orifices connecting the hollow interior to combustion chambers, thus providing air for combustion process; 2) one or more auger blades disposed substantially spirally around a portion of length of the screw conveyor, the auger blades being configured to move waste fuel along the longitudinal axis as the screw conveyor revolves; 3) a first combustion chamber disposed substantially centrally around the screw conveyor and around at least one orifice connecting the longitudinal hollow interior with the outer surface of the screw conveyor; 4) a second combustion chamber disposed substantially concentrically around the first combustion chamber and configured to receive burning waste fuel from the first combustion chamber, the second combustion chamber being in fluid communication with at least one air intake orifice disposed on a housing and configured to provide air for the waste fuel burning; and 5) a third combustion chamber disposed substantially concentrically around the second combustion chamber and configured to receive waste plastic from the second combustion chamber, the third combustion chamber being in fluid communication with at least one air intake orifice disposed on the housing and configured to provide air for the waste fuel burning.

In one aspect of this yet another embodiment of the present invention, the burner system includes discharge blades attached with a feed mechanism for swirling combustion gases and flushing non-combustible material out of the burner system.

In another aspect of the present invention, the burner system includes an air blower configured to provide air for waste plastic burning.

In yet another aspect of the present invention, the burner system includes an auxiliary burner configured to start burning of waste plastic.

In still yet another aspect of the present invention, the burner system includes another auxiliary burner configured to start burning of waste plastic.

In yet another aspect of the present invention, the burner system includes a motor coupled to the screw conveyor for revolving the screw conveyor.

In another aspect of the present invention, the motor of the burner system is a constant speed motor.

In one aspect of the present invention, the constant speed motor of the burner system includes a chain drive engaging the screw conveyor.

In another aspect of the present invention, the motor of the burner system is a variable speed motor.

In yet another aspect of the present invention, the variable speed motor of the burner system is a direct drive motor.

In still yet another aspect of the present invention, the first combustion chamber of the burner system is adapted to increase air flow for combustion of substantially all the burning waste fuel.

In yet another aspect of the present invention, the burner system includes an intelligent control system for controlling operation of at least the screw conveyor, the one or more auger blades, the first combustion chamber, the second combustion chamber, and the third combustion chamber.

In another aspect of the present invention, the intelligent control system of the burner system includes an emergency stop circuit for stopping operation of the burner system.

In one aspect of the present invention, the burner system includes a boiler coupled to the third combustion chamber for heating water and/or oil in the boiler.

In still yet another embodiment of the present invention, a burner system for consuming waste fuel, comprises 1) a combustion unit having at least three combustion chambers arranged concentrically around a variable speed conveyor screw for directing the waste fuel along a fuel consumption path through said at least three combustion chambers; 2) an air chamber surrounding said at least three combustion chambers to facilitate preheating combustion air delivered to said at least three combustion chambers and to facilitate insulating said at least three combustion chambers against thermal losses to the environment; a boiler in fluid communication with said at least three combustion chambers for heating water and/or oil to facilitate an energy conversion process; and 3) an intelligent control system for controlling operation of the system, said control system for further helping to control operating parameters of said boiler including pressure, temperature, and water and/or oil level and for activating an emergency stop alarm if any one of the operating parameters of said boiler is outside a predetermined range of operating valves.

In another aspect of present invention, the control system includes sensors for helping to control the operation of a variable frequency drive motor coupled to an auger rotatably feeding a waste fuel into said combustion unit, the auger being rotated at a non-operational speed, so that the waste fuel is delivered at a lean rate; and for facilitating the operation of the variable frequency drive motor for feeding the waste fuel into said combustion unit at an operational speed, so that the waste fuel is delivered at a run rate.

In yet another aspect of the present invention, control system further includes sensors for facilitating the automatic operation of said combustion unit for a predetermined demonstration time to demonstrate operation of the combustion unit.

BRIEF DESCRIPTION OF THE DRAWINGS

The invention will be more fully understood by reference to the detailed description in conjunction with the following figures, wherein.

DETAILED DESCRIPTION OF THE INVENTION

Figure 1A:
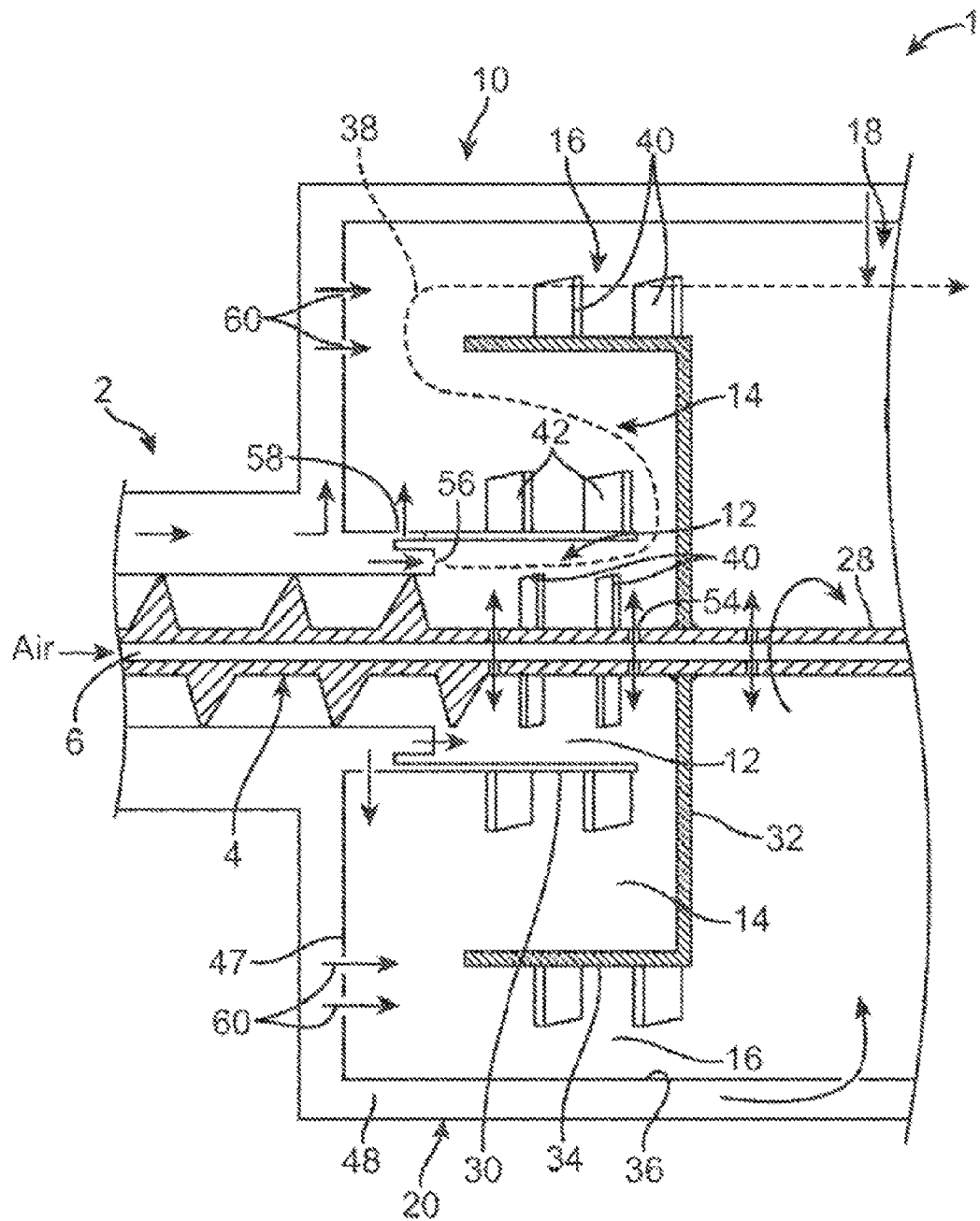
FIGS. 1A and 1B show partial sectional plan and right views, respectively, of a first embodiment of the invention.
Figure 1B:
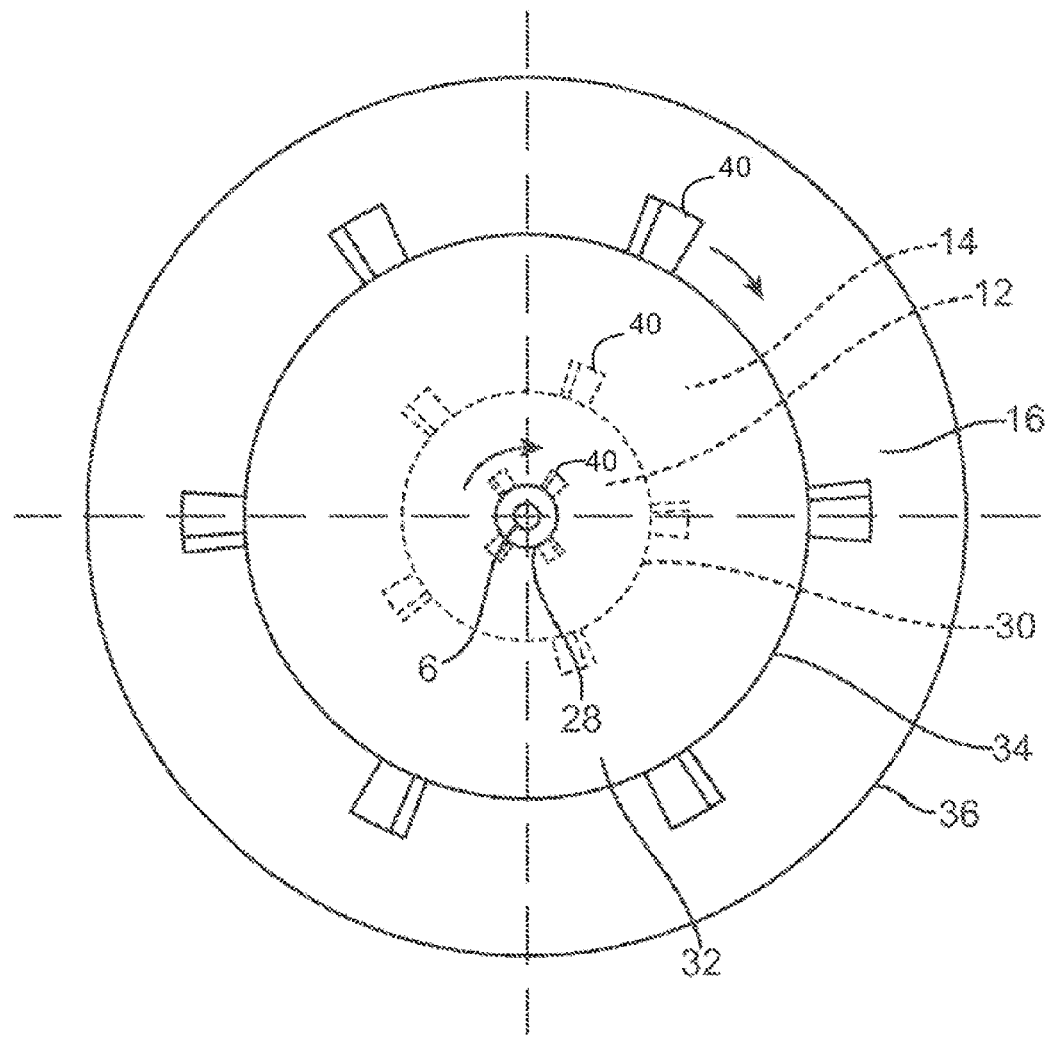
Figure 2:
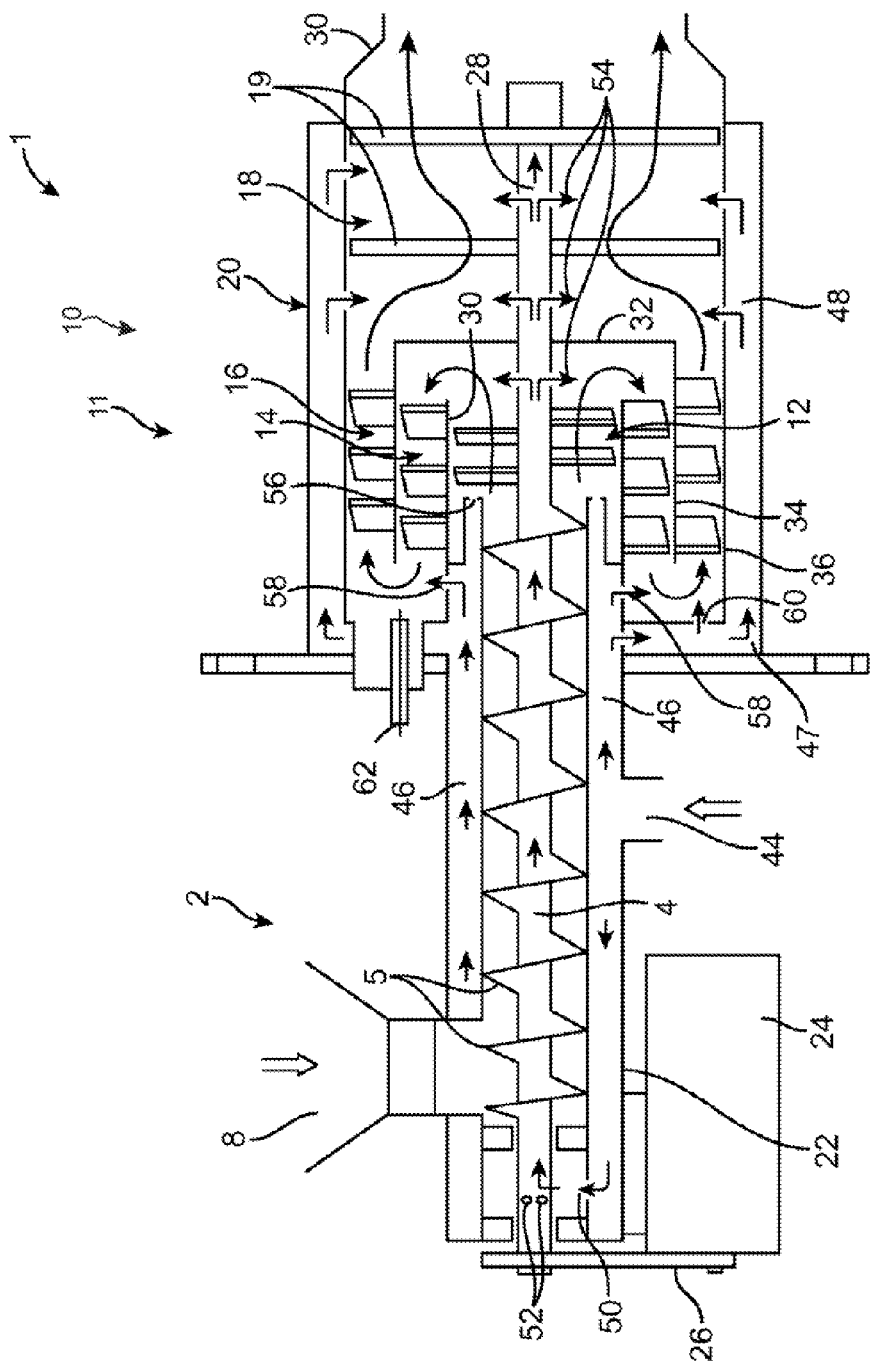
FIG. 2 shows a side sectional view of a second embodiment of the invention.

Referring to FIGS. 1A, 1B, and 2, a burner system 1 for burning waste material, particularly waste plastic, has a feed mechanism 2 defined by an elongated transport or conveyor screw 4 provided with a central lumen 6 extending substantially through the entire length of the conveyor screw 4. The conveyor screw 4 is situated below an intake opening 8 of the feed mechanism and extends forwardly (to the right as seen in FIGS. 1A and 2) to a combustion unit 10. The combustion unit 10 that is defined by a plurality of concentric combustion chambers, indicated generally at 11, include, for example, a first combustion chamber 12, a second combustion chamber 14, and a third combustion chamber 16. The plurality of combustion chambers 11 is coaxially disposed about conveyor screw 4 at increasing radial distances from the conveyor screw 4. The downstream end of the third combustion chamber 16 is in fluid communication with a discharge section 18 of the burner system 1, which receives smoke and incombustible particulates from the plurality of combustion chambers 11 and discharges these materials from the burner system 1 into the atmosphere, via a nose cone 30'. A double walled outer housing 20 defines an air passage 48, which surrounds a portion of the conveyor screw 4, the combustion unit 10 and the discharge section 18.

Feed mechanism 2 of burner system 1 includes the earlier mentioned conveyor screw 4 with spiral windings 5 and a generally tubular, double walled conveyer housing 22, which partially encloses the rotating screw 4. A motor 24 drives a shaft 28 of the screw 4 via a chain 26. Other suitable drives such as a gear drive, a belt drive or the like can be employed, so there is no intention of limiting the disclosed invention to only a chain driven shaft.

Intake opening 8 is arranged proximate to an upstream end of the screw 4 (on the left as seen in FIG. 2) through which plastic waste or other material is entrained for conveyance in a downstream direction (to the right as seen in FIG. 2) towards combustion unit 10. The downstream end of shaft 28 of screw 4 is free of spiral windings and extends into the combustion unit 10 where it is suitably journaled.

Combustion unit 10, as already described, is formed by the three concentric combustion chambers 12, 14, 16, each of which has inner and outer radial boundaries that are concentric with the axis of shaft 28 and interconnected by radially extending walls. In particular, the inside radial boundary of first combustion chamber 12 is defined by the area bounded by the outer surface circumference area of conveyor shaft 28. The outside radial boundary of first combustion chamber 12 is defined by an interior surface area of an extension 30 of the tubular housing portion 20 surrounding the conveyor screw 4. The inside radial boundary of second combustion chamber 14 is defined by the exterior surface area of the extension 30. The outside boundary of the second chamber 14 is defined by a tubular wall 34 that is coaxial with and spaced apart from extension 30. An end wall 32 that is connected to and substantially perpendicular to tubular wall 34 is fixed to conveyor shaft 28 and is axially spaced from a downstream end of extension 30, so as to form a transition space between the first and second combustion chambers 12, 14. Finally, an exterior surface of tubular wall 34 defines the inside radial boundary of third combustion chamber 16, while the outside radial boundary of the third combustion chamber is formed by a portion of the inside interior surface area of housing 20, as best seen in FIGS. 1A and 2. The transition space between the second combustion chamber 12 and third combustion chamber 16 is provided by radial air passage 47 of housing 20. The downstream end of the third combustion chamber 16 opens to the discharge section 18 of the burner system 1.

As is illustrated in FIG. 1A, gaseous material, particulates and the like from first combustion chamber 12 move along an S-shaped line 38, past the second combustion chamber 14 and the third combustion chamber 16, and into discharge section 18. As best seen in FIG. 1B, to facilitate movement of the materials through the plurality of combustion chambers 11, a plurality of sets of auger plates 40, which are preferably inclined relative to the axis of shaft 28 to help advance the materials in a downstream direction, are suitably arranged on the inner radial surfaces of the first through third combustion chambers 12, 14, 16. In the embodiment illustrated in FIG. 2, the auger plates for the first and third combustion chambers 12, 16 rotate with shaft 28, while the set of auger plates 40 for the second combustion chamber 14 are stationary. Alternatively, the plates for the second combustion chamber 14 can be mounted on the inside of tubular wall 34 so that they, too, rotate with the shaft 28. Waste fuel, in particular, waste plastic fuel, introduced through intake opening 8, is moved in a downstream direction (to the right as seen in FIGS. 1A and 2) and it enters first combustion chamber 12. Auger plates 40 in the first combustion chamber 12 distribute the material relatively evenly where it is liquefied, gasified and ignited by heat generated by flames and friction or heat transfer via tubular wall 34. The resulting partially combusted waste plastic together with flames, smoke and other particulates generated in the first combustion chamber 12 propagates in a downstream direction through second and third combustion chambers 14, 16 where the waste plastic burns so that substantially only smoke, gaseous matter and non-combustible particulates are then discharged into the discharge section 18 of the burner system 1. Rotational discharge blades 19 swirl the exhaust gas flow, thus improving a flush-out of the incombustible materials from the burner system 1. The discharge blades 19 which provide a sufficient swirling of the incombustibles may be made in different shapes. One example is a substantially propeller shaped discharge blade.

A particular advantage provided by the waste burner system 1 of the present invention is that fresh combustion air is provided just upstream of each of the combustion chambers 12, 14, 16. Complete incineration of all the waste plastic takes time, thus feeding just sufficient air at the upstream end of each chamber helps to sustain optimal combustion therein. Optimal combustion, in turn, helps to maintain maximum temperature in each chamber 12, 14, 16, because combustion air that is needed further downstream in the process, namely in the second and third combustion chambers 14, 16, does not travel through the combustion chamber 12 where it is not needed and need not be heated. In addition, the flow of relatively cool combustion air along the outside of the housing 20 enhances energy efficiency because the air flow reduces heat losses from the combustion unit 10 to the atmosphere, while at the same time preheating the air needed for the combustion in the combustion chamber.

Referring now to FIG. 2, according to a second embodiment, air for incinerating waste plastics is supplied from a suitable source (or sources) at an air inlet 44, like, for example, a fan or a blower (not shown) used to enhance the air intake. Air next enters inner air passage 46 defined by tubular double-walled housing portion 22. Some of the air in passage 46 is released into the space for conveyor screw 4 from an orifice 50, enters shaft lumen 6 via inlets 52, and continues to flow in the direction of combustion unit 10, while simultaneously cooling the conveyor screw 4, thus increasing the reliability of the conveyor screw 4 and its bearings. The remainder of the air in the annular inner air passage 46 continues in a downstream direction and partially encircles first combustion chamber 12. A radial air passage 47 fluidically connects axially extending inner air passage 46 with axially extending outer air passage 48, which surrounds combustion unit 10 and discharge section 18 of the burner.

As shown in FIG. 2, air from the lumen 6 is discharged via first, second and third sets of orifices 54 arranged, respectively, in the transition space between the first and second combustion chambers 12 and 14 and into discharge section 18 of the burner, as is further described below. Additionally, the air needed for burning the waste plastic is separately introduced into each of the three combustion chambers. Air flowing along air passage 46 is discharged into an upstream portion of first combustion chamber 12 via orifices 56. A further set of housing orifices 58 is arranged upstream of third combustion chamber 16 and extends from air passage 46 into the transition space between the second and third combustion chambers 14, 16. Instead of or in addition to orifices 58, radial air passage 47 can be provided with additional orifices such as, for example, orifices 60 located just upstream of third combustion chamber 16, as shown in FIG. 2. Air for the second combustion chamber 14 is introduced by the first set of orifices 54 (located on screw 4) into the transition space between the first and second combustion chambers 12, 14 and therefore also upstream of the second combustion chamber. The air flow through orifices 54, 56, 58 and 60 is suitably modulated to match the air flow rate to the amount of waste plastics introduced through intake opening 8.

To facilitate the incineration of waste plastic, particularly during startup operations, an auxiliary burner 62 in the transition space between the second and third combustion chambers 14, 16 for heating all three chambers, either directly (chamber 16) or indirectly (chamber 12 via housing section 30 extending into the combustion unit and chamber 14 via tubular wall 34). The auxiliary burner 62 may be oil burner, gas burner, solid fuel burner, or electrical heater. The inventors have found that using the auxiliary burner for about 5 minutes preheats the waste plastic sufficiently to efficiently start the combustion.

Figure 3:
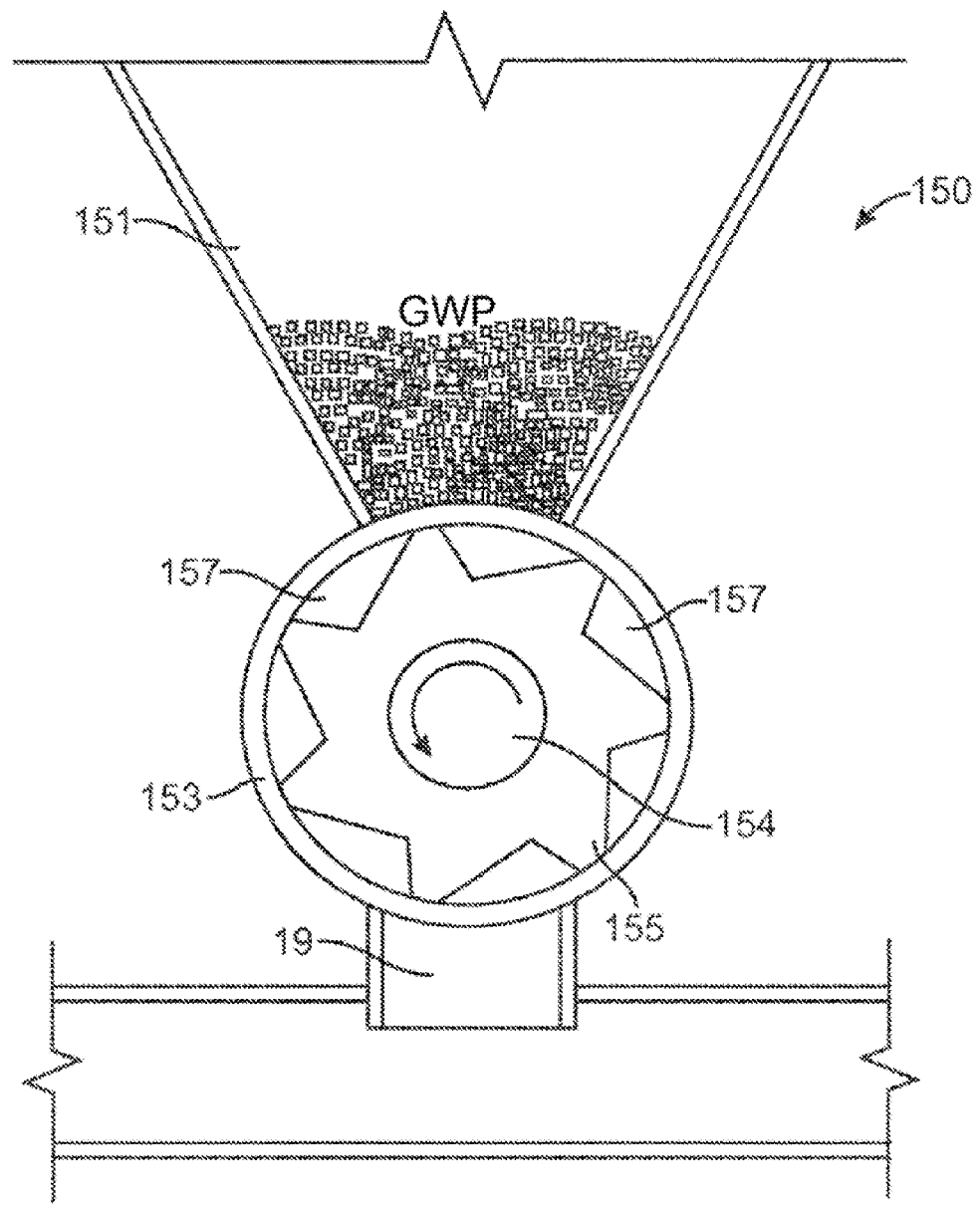
FIG. 3 shows a detail sectional view a fuel supply unit.

Referring now to FIG. 3, a waste plastic supply unit 150 can be attached to the intake opening 8. Waste plastic is deposited in a fuel hopper 151, wherefrom it is gravitationally fed into rotator housing 153. A granular waste plastic GWP is illustrated in the fuel hopper 151, but other constitutions of the waste plastic are possible. Rotation of a rotator 154 directs waste plastic towards the intake opening, and further toward the conveyor screw 4. The inventors have found that the rotator protrusions 155 having a triangle or a semi-circular shape work well, but other rotator protrusion shapes can also be used. The inventors have also found that inclining the rotator protrusions 155 in the direction opposite from the direction of their rotation minimizes sticking of the waste plastic against the rotator housing 153.

Figure 4:
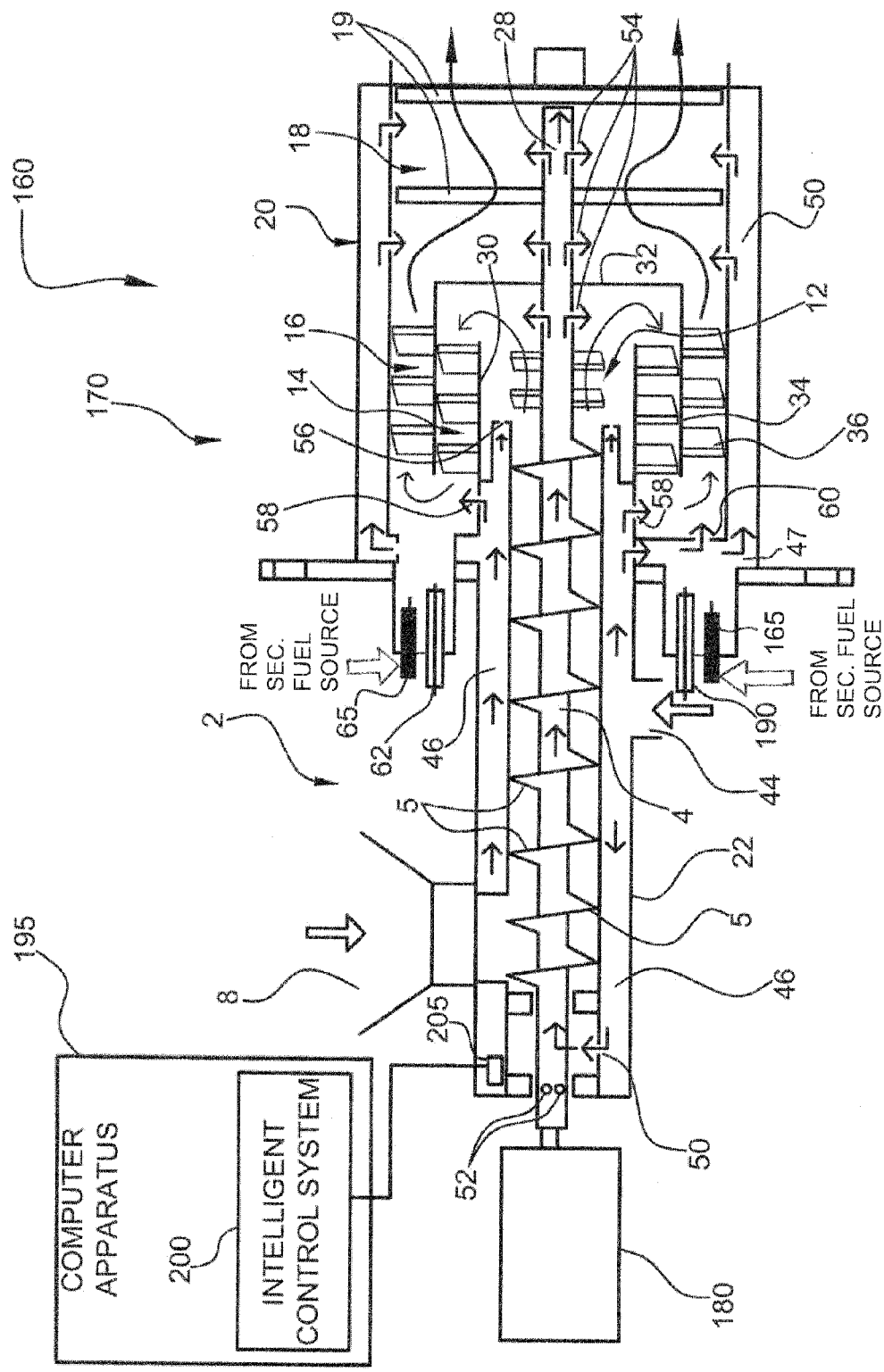
FIG. 4 shows a side sectional view of a third embodiment of the invention.
Figure 5:
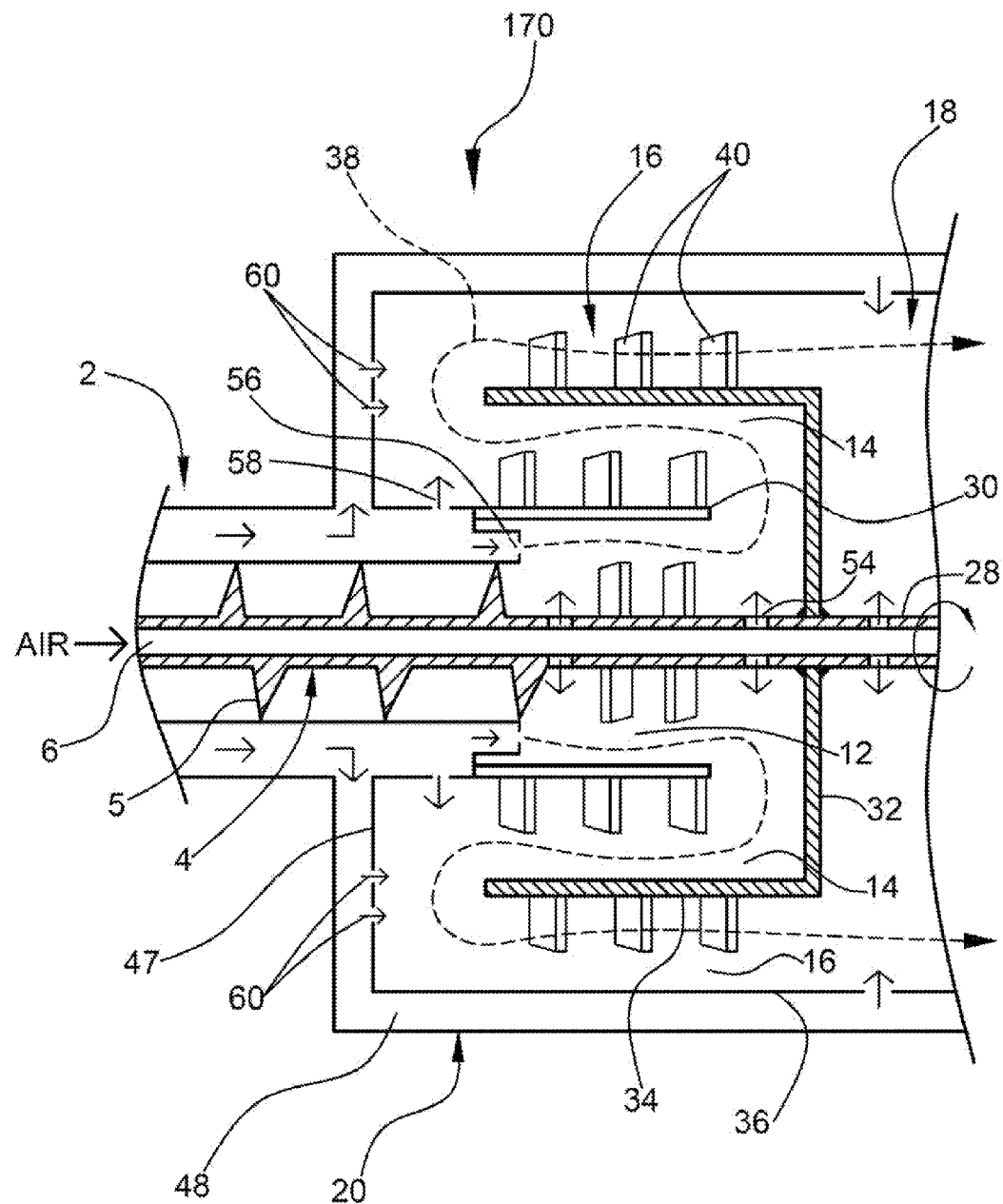
FIG. 5 shows a plan view of the third embodiment of the invention.

Referring to FIGS. 4 and 5, there is shown an alternative or third embodiment of another burner system, generally referred to as 160. The burner system 160 includes another embodiment of a combustion unit, generally referred to as 170. In this embodiment of combustion unit 170, nose cone 30 is eliminated. Elimination of nose cone 30 increases air flow within and exiting combustion unit 170. The increased air flow and exhaust allows combustion of substantially all solid fuels moved into combustion unit 170 by conveyor screw 4. This ability to obtain substantially complete combustion of solid fuels substantially increases energy output of burner system 160 while reducing energy consumption and therefore improving overall financial performance of burner system 160 by about 50%.

Referring again to FIGS. 4 and 5, a variable frequency drive (hereinafter, VFD) motor, such as variable speed, direct drive motor 180 is coupled to conveyor screw 4 for revolving or rotating conveyor screw 4. The previously mentioned second embodiment burner 1 includes motor 24 that drives shaft 28 of conveyor screw 4 by means of a chain 26. However, this alternative or third embodiment burner system 160 includes variable speed, direct drive motor 180, rather than motor 24 of burner 1. The direct drive and variable speed capability of motor 180 that belongs to alternative embodiment burner system 160 allows burner system 160 to accommodate variable size and density of solid fuels. Accommodating variable size and density of solid fuels, in turn, increases capacity of burner system 160 and reduces energy consumption of burner system 160. More specifically, direct drive motor 180 increases overall efficiency by reducing energy consumption and allows for increased variances in fuel types, sizes and feed rates which, in turn, substantially increases overall energy output of burner system 160 by over approximately 50%. In addition, direct drive motor 180 provides more power to auger shaft 28 and therefore aids in releasing fuel that might otherwise stick or adhere to shaft 28. Also, the increased power of direct drive motor 180 can increase speed of fuel feeding. Moreover, the increased power of direct drive motor 180 increases the capability of burner system 160 to efficiently accept dual fuel compositions, such as waste plastic combined with liquid oil.

As best seen in FIG. 4, a second igniter or auxiliary burner 190 is provided in addition to the first igniter or auxiliary burner 62. In a manner similar to location of auxiliary burner 62, second auxiliary burner 190 is provided in the transition space between the second and third combustion chambers 14, 16 for heating all three chambers, either directly or indirectly. A purpose of second auxiliary burner 190 is to decrease time needed to preheat combustion unit 170 and for the introduction of a larger volume of liquid fuel that can be used in conjunction with solid plastic fuels. Decreasing time needed to preheat combustion unit 170 and introducing a larger volume of liquid fuel increases overall efficiency of combustion unit 170 by about 50%.

As best seen in FIG. 4, a pair of fuel injectors 65 and 165 is also provided in the transition space between the second and third combustion chambers 14, 16 for amplifying the burning of the waste fuel to facilitate increasing the energy output of the combustion unit 170. In this regard, a fuel, such as oil, or gas, is directly injected into the combustion chambers to increase the burn rate of the waste fuel as it passes through the third chamber 16. The fuel is supplied through fuel lines from a secondary fuel source.

Figure 5A:
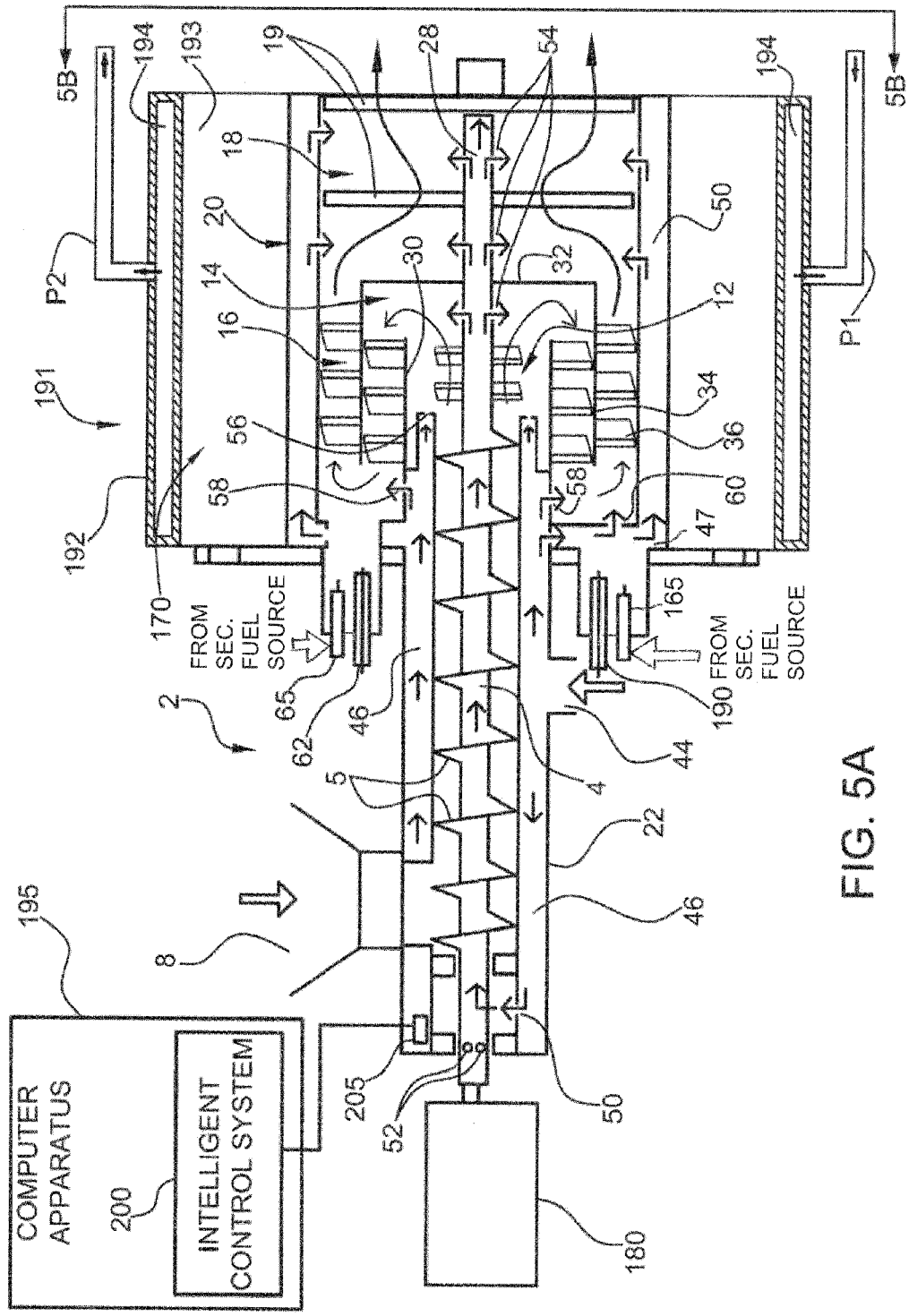
FIG. 5A shows a side sectional view of a fourth embodiment of the invention.
Figure 5B:
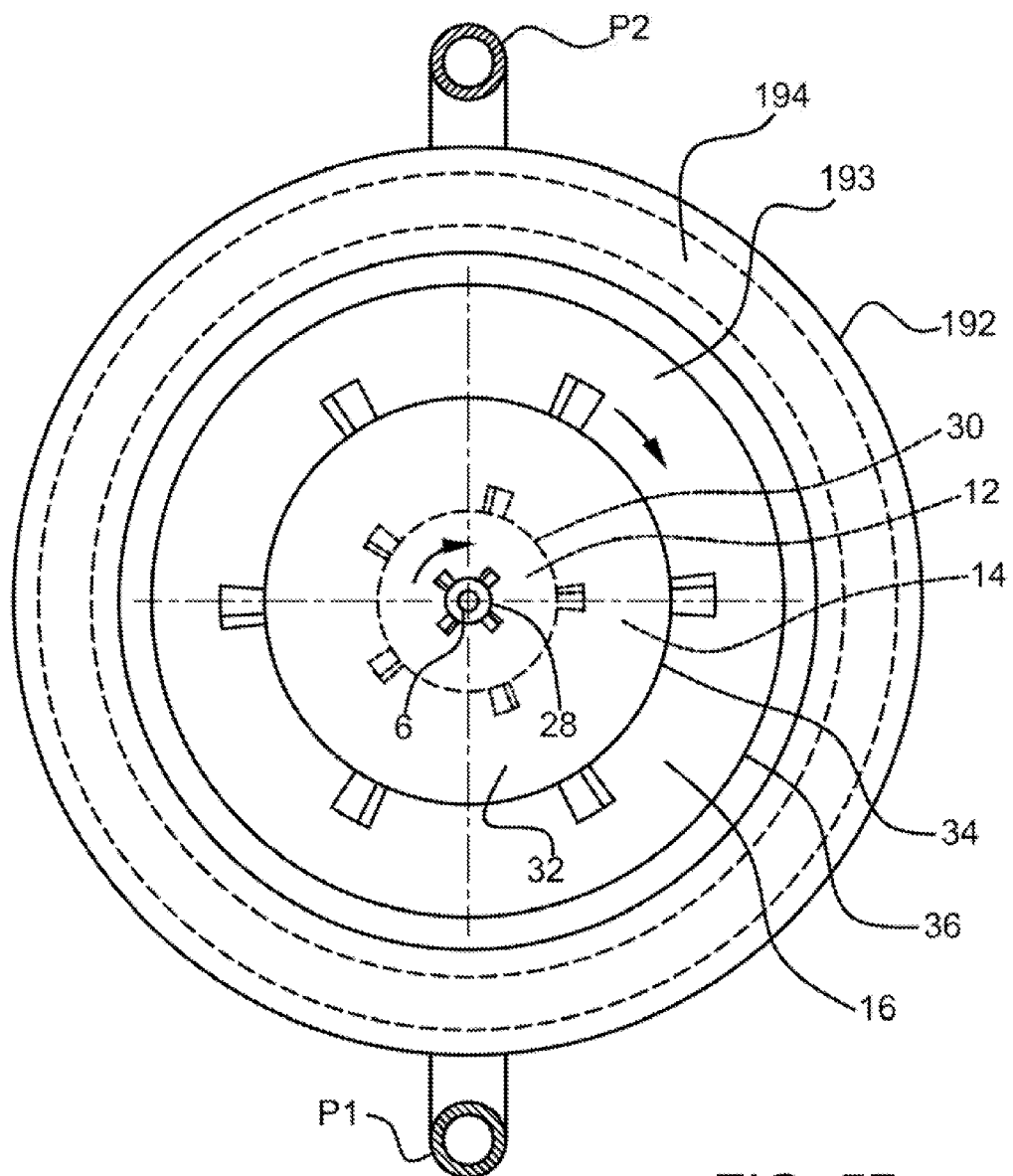
FIG. 5B is a view along section line 5B-5B of FIG. 5A.

Referring to FIGS. 5A and 5B, there is shown an alternative or fourth embodiment of the burner system, generally referred to as 191. Burner system 191 is substantially similar to third embodiment burner system 160, except a boiler 192 is included to heat a fluid, such as water and/or oil, for any process requiring fluid of elevated temperature, such as in the case of district heating. In the case of district heating, fluid (e.g., water) in boiler 192 will be heated by burning waste fuel, such as waste plastic, and then pumped through insulated, underground or above-ground plumbing/pipes (not shown) to homes and businesses for use in space heating, water heating and industrial processes. Once energy from the heated fluid is used by the home or business, the fluid can be returned to boiler 192 by means of underground or above-ground plumbing/pipes. Thus, such a piping system will be a closed-loop piping system (not shown). As an example of another application, boiler 192 may be configured to produce steam for uses such as generating electricity by passing the steam through a suitable turbine-generator (not shown). Alternatively, high pressure oil (e.g., thermal oil) for use in driving single or multiple turbines that generate electricity. In one configuration, boiler 192 is coupled to combustion unit 170 and is an annular cylinder defining a central longitudinal cavity 193 in which combustion unit 170 is disposed. Boiler 192 and combustion unit 170 are coaxially aligned, as shown. An annular fluid chamber 194 is formed in boiler 192 and extends longitudinally substantially the entire length of boiler 192. A fluid inlet pipe P1 is coupled to boiler 192 and is in fluid communication with fluid chamber 194 for supplying the fluid to fluid chamber 194. In addition, a fluid outlet pipe P2 is coupled to boiler 192 for exit of heated fluid (e.g., water, water and/or oil, steam), as the case may be, from fluid outlet pipe P2. It should be appreciated that the boiler 192 configuration that is described herein comprises only one exemplary configuration for boiler 192, there being many possible configurations for boiler 192. For example, boiler 192 is shown as horizontally oriented. Alternatively, boiler 192 may be vertically oriented, if desired. Vertical orientation of boiler 192 may be desirable when horizontal space is limited.

It will be appreciated by a person of ordinary skill in the art of power generation that it is important to control operation of burner systems 160, 191, so that burner systems 160, 191 perform at optimum efficiency, safely and with minimum operator intervention. Therefore, in order to suitably control burner systems 160, 191, a computer apparatus 195 includes an intelligent control system, generally referred as 200, as described in detail hereinbelow. Intelligent control system 200 includes a plurality of sensors 205 (only one of which is shown) disposed in burner systems 160, 191 for sensing or measuring the operational parameters of burner systems 160, 191, such as pressure, temperature, boiler fluid level, power generated, as well as other operational parameters of burner systems 160, 191. With reference to FIGS. 4 and 5, burner system 160 does not include boiler 192, it being understood that burner system 160 may include boiler 192 as an option, if desired. Sensing these operational parameters will allow an operator of burner systems 160, 191 to monitor the operational parameters and take appropriate corrective action should any one of the operational parameters fall outside a permissible predetermined range of values. However, it will be appreciated that intelligent control system 200 will be capable of automatically taking any necessary corrective action with minimum operator interaction. In addition, intelligent control system 200, which will use a computerized software platform with an open architecture, is adapted to integrate therewith off-the-shelf, commercially available boiler vessel management systems. Such a commercially available boiler vessel management system may be of a type such as may be available from Tru-Steam Boilers & Services Pty Ltd, located in Chipping Norton, Australia.

In addition, intelligent control system 200 will provide substantially complete control and monitoring of all burner mechanical and electrical components, so that burner systems 160, 191 perform at optimum efficiency, safely and with minimum operator intervention. Intelligent control system 200 will provide redundant safety capability for substantially all functional components of burner systems 160, 191. A control panel (not shown) will also substantially enhance performance of burner systems 160, 191 by providing operator or automatic control of each function of burner systems 160, 191. Integration and interface design for boiler safety systems will virtually ensure burner systems 160, 191 operate within predetermined and safe parameter ranges for a preselected boiler vessel, such as boiler 192. Also, intelligent control system 200 will assist in enabling use of burner systems across a broad spectrum of applications including the ability to manage energy output and use of various fuel types. It is believed that use of intelligent control system 200 will increase overall performance of burner systems 160, 191 by about 75%. The method of operation of intelligent control system 200 is described hereinbelow.

Figure 6:
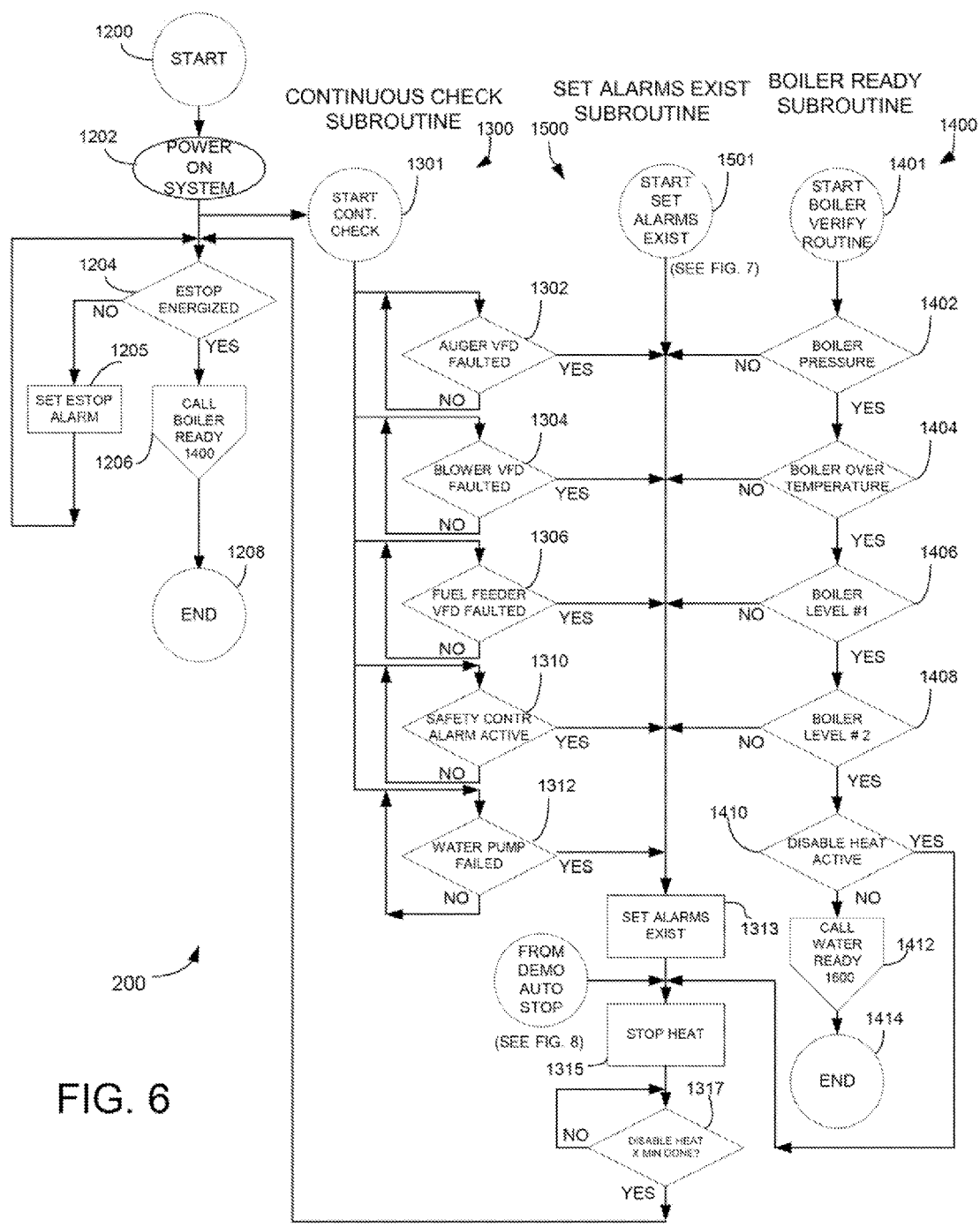
FIG. 6 shows a flow chart of an intelligent control system belonging to the third and fourth embodiments of the invention.
Figure 7:
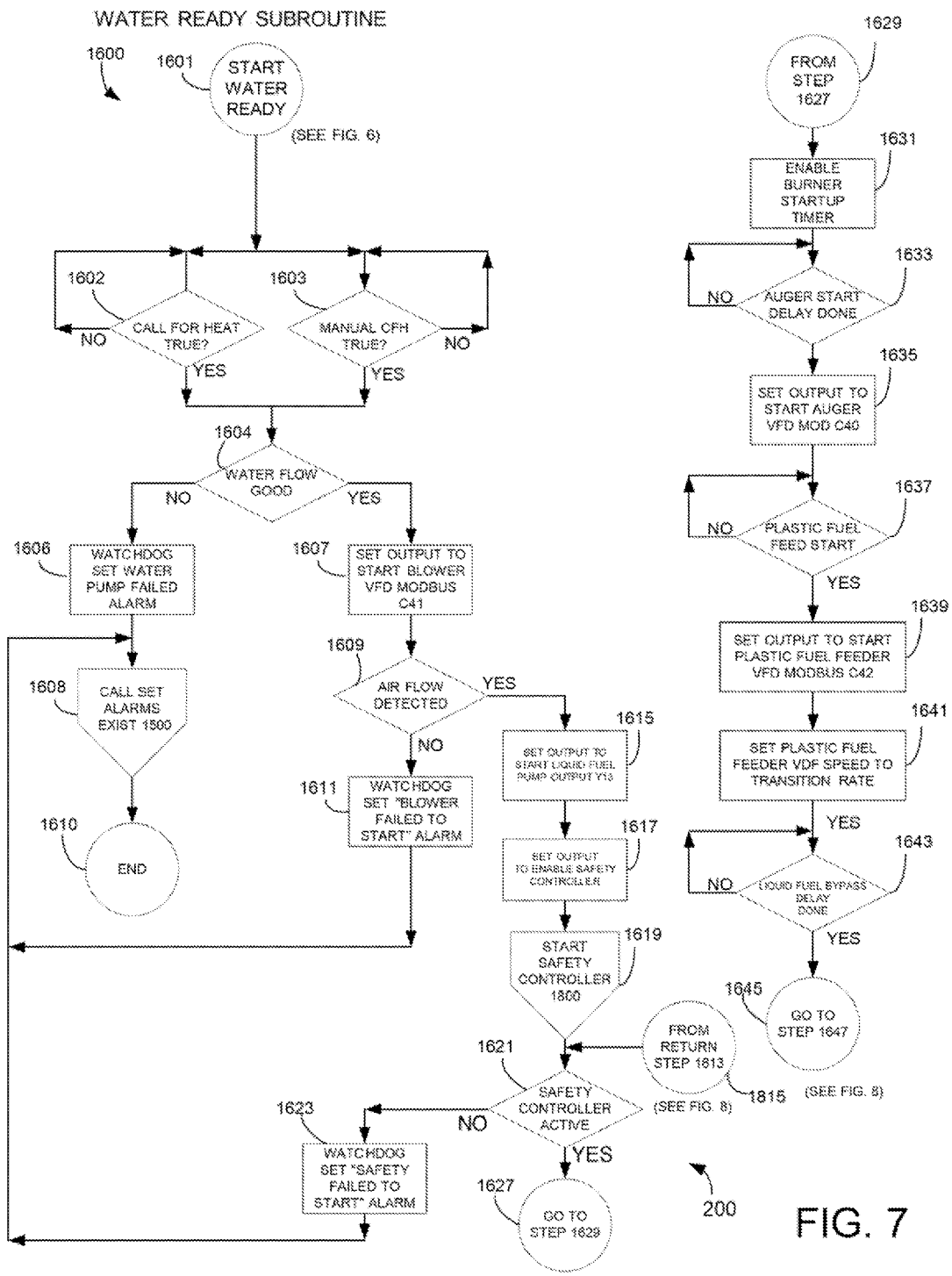
FIG. 7 is a continuation of the flow chart of FIG. 6.
Figure 8:
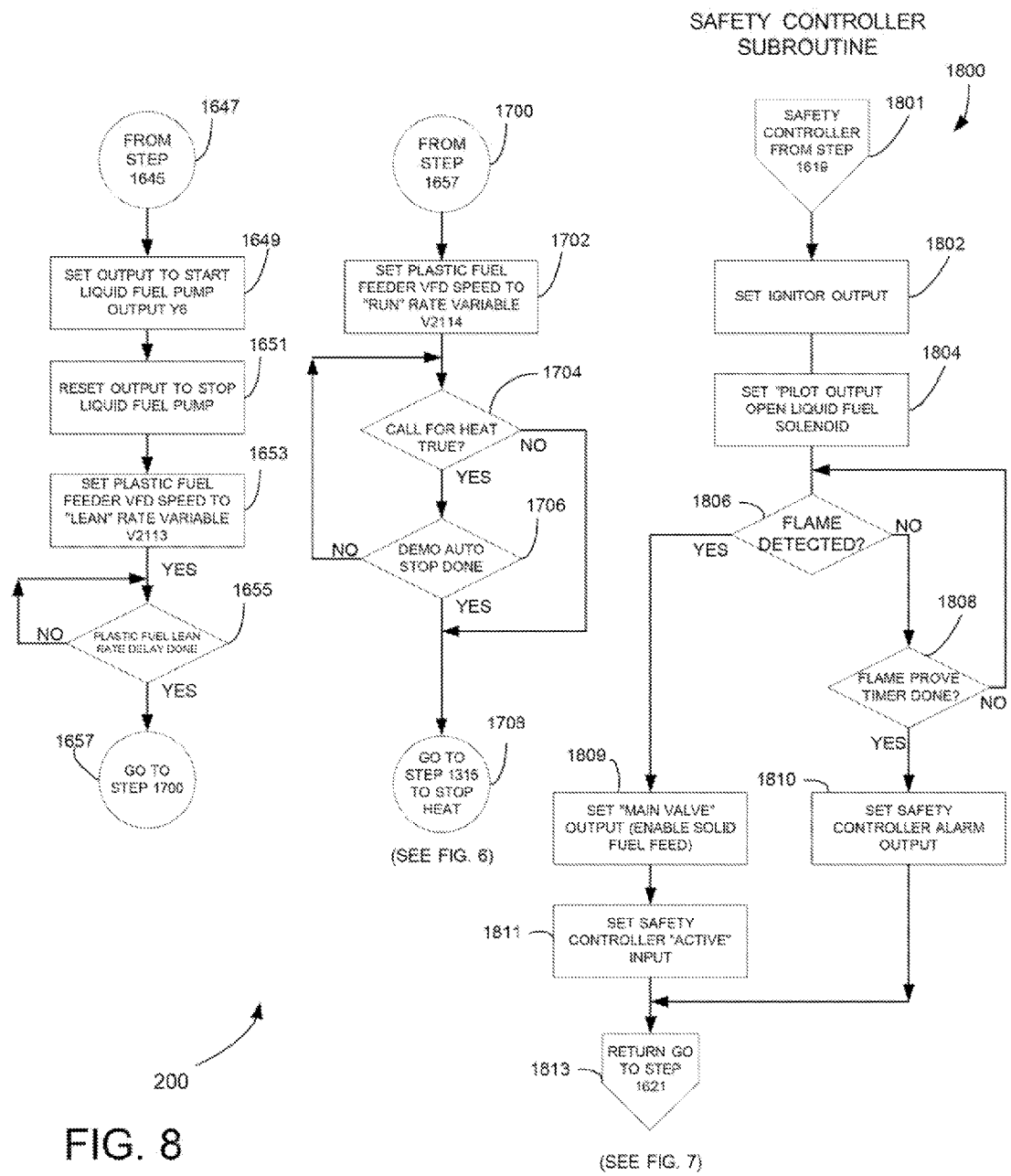
FIG. 8 is a further continuation of the flow charts of FIGS. 6-7.
Figure 9:
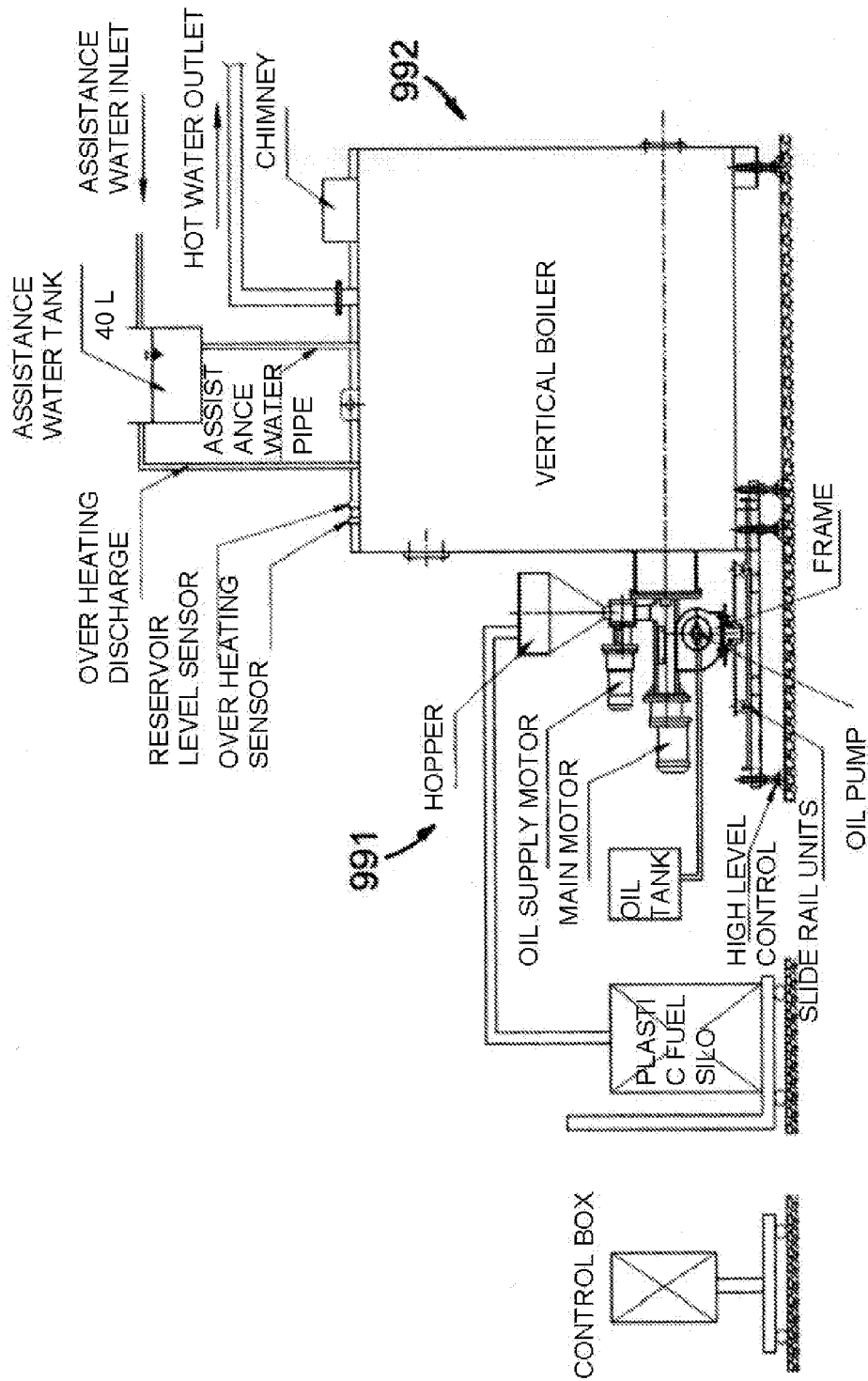
FIG. 9 illustrates a burner coupled to a vertical boiler, which burner boiler system is constructed in accordance with the present invention.

Therefore, referring to FIGS. 6, 7 and 8, there is shown a flow chart illustrating the methods by which intelligent control system 200 controls burner systems 160, 191. For purposes of brevity, the methods by which intelligent control system 200 controls burner systems 160, 191 will be described only with reference to burner system 191, it being understood that the methods may apply to burner system 160, as well. The method of intelligent control system 200 starts at a step 1200 by the operator of burner system 191 activating a power-on system step 1202. Activating power-on system step 1202 supplies electrical power to intelligent control system 200 and begins operation of burner system 191. It should be appreciated by a person of ordinary skill in the art of power generation that power-on system step 1202 may include a "toggle switch" (not shown) that energizes intelligent control system 200 when placed in a first position and de-energizes intelligent control system 200 when placed in a second position.

As best seen in FIG. 6, power-on system step 1202 generates a signal that is received by a decision step 1204. The decision step 1204 determines whether an emergency stop (hereinafter "ESTOP") circuit has been energized. The ESTOP circuit (not shown) must be energized for motion devices to be powered and operational, such as previously mentioned variable frequency drive motor 180 (i.e., VFD 180). The ESTOP circuit may be either manually or automatically operated to shut-down burner system 191 in an emergency, such as might occur during boiler overpressure, based on a signal output from previously mentioned sensor 205 (see FIG. 4). Referring to FIG. 6, the ESTOP circuit at step 1204 is enabled by a programmable logic circuit (hereinafter "PLC" circuit, not shown) output and preferably by two maintained pushbuttons (not shown). PLC instructions may be loaded into the PLC from a pre-programmed Erasable Programmable Read Only Memory (EPROM, not shown) or an Electrically Erasable Programmable Read Only Memory (EEPROM, also not shown) included in the PLC. Also, one of the maintained pushbuttons turns-on the ESTOP circuit to energize the ESTOP circuit and the other maintained pushbutton turns-off the ESTOP circuit to de-energize the ESTOP circuit. If the ESTOP circuit is not energized, then a "false" output signal (hereinafter a "no" output signal) is generated by decision step 1204. The "no" output signal activates an ESTOP alarm at a step 1205. An output signal from the ESTOP alarm activated at step 1205 continuously loops back to decision step 1204, whereupon decision step 1204 again tests whether the ESTOP circuit has been energized. It should be appreciated by a person of ordinary skill in the art of power generation that if the ESTOP circuit is de-energized (i.e., output from decision step 1204 is "no"), the PLC in the ESTOP circuit will detect the condition and display the appropriate alarm message on a Human Machine Interface panel (i.e., "HMI panel", not shown) that may be located in an operator control room (also not shown) associated with burner 160. However, if the ESTOP circuit is energized, then a "true" output signal (hereinafter "yes" output signal) is generated by decision step 1204. The ESTOP alarm is in an "on" state only upon depressing of the previously mentioned ESTOP push buttons or failure of PLC output. At a step 1206, the "yes" output signal from the ESTOP circuit (i.e., from step 1204) is used to initiate a call subroutine step 1206, which calls the "boiler ready" subroutine 1400 to verify that the boiler (see FIG. 5A) belonging to burner 160 is ready to start operation. After the call step 1206 has been executed, the program advances to an end step 1208, since the boiler ready subroutine 1400 is now being executed by the program. The boiler ready subroutine 1400 is best seen on FIG. 6.

Referring again to FIG. 6, when power is supplied to intelligent control system 200 by activating the power-on system at step 1202, a continuous check subroutine 1300 is initiated which begins with a start step 1301. The system parameters comprise at least auger VFD, blower VFD, fuel feeder VFD, safety controller alarm active, and fluid pump failed, which parameters are detected, sensed or measured by previously mentioned plurality of sensors 205 (see FIG. 4). As shown in FIG. 6, when the continuous check of system parameters starts at step 1301, auger VFD faulted is checked at decision step 1302. If auger VFD faulted is not active, then a "no" signal is generated at decision step 1302 and the fault condition is checked again. The continuous check method does not proceed further, until a fault condition is detected at decision step 1302 which, in turn, results in a "yes" signal and the method proceeds to a set alarms exist command step 1313.

The program then advances to a stop heat command step 1315 which disables the burner system 191. Next the system proceeds to a decision step 1317 to determine whether the burner system 191 has been disabled for a predetermined number of minutes, where the predetermined number of minutes is a sufficient number of minutes to allow the burner system 191 to cool down. The program will loop at this decision step 1317 until the predetermined number of minutes has elapsed. Once the predetermined number of minutes has elapsed, a yes condition exists and the program then proceeds to the decision step 1204 and proceeds as previously described relative to that decision step 1204.

In FIG. 6, when the call boiler ready subroutine step 1206 is executed, the boiler verification subroutine 1400 begins at a start step 1401 to verify the boiler 192 is ready for operation.

In this regard, the system proceeds to a set of boiler ready decision steps 1402, 1404, 1406, 1408, and 1410 that will be described hereinafter in greater detail. The verification begins at a pressure verification decision step 1402, and if the pressure of the boiler is not within a correct range, a "no" signal is generated which causes the program to advance to the command step 1313 where the program proceeds as previously described with a set alarms exist. If instead, the pressure is within range, a "yes" signal is generated allowing the program to advance to a boiler over temperature decision step 1404. If the boiler 192 has an over temperature condition, a "no" signal is generated which causes the program to advance to the command step 1313 where the program proceeds as previously described with a set alarms exist. If instead, the boiler temperature is within range, a "yes" signal is generated to permit the program to jump to the next decision step 1406 to verify that the first boiler water level is sufficient. The terminology "water level" is intended to include "water and/or oil level" because the fluid in the boiler can be water alone or a combination of water and oil. If the first boiler water level is not sufficient, a "no" signal is generated which causes the program to advance to the command step 1313 where the program proceeds as previously described with a set alarms exist. If instead, the first boiler water level is sufficient, a "yes" signal is generated and the program goes to the next decision step 1408 to verify that the second boiler water level is sufficient. If the second boiler water level is not sufficient, a "no" signal is generated which causes the program to advance to the command step 1313 where the program proceeds as previously described with a set alarms exist. If the second boiler water level is sufficient, a "yes" signal is generated and the program advances to a decision step 1410.

Next, at the decision step 1410, the program detects whether the "disable heat sensor" is active. If it is active, a "yes" signal is generated and the system goes to the command step stop heat at step 1315, where the system proceeds as described previously. If the disable heat active sensor is not active at decision step 1410, the program advances to a call command to call the water ready subroutine 1600 that will be described hereinafter in greater detail. After the call command 1412 is executed the program proceeds to an end step 1414 as the water ready subroutine 1600 will not be executed.

Turning now to FIG. 7, at a step 1601, the water ready call signal from step 1412 (see FIG. 6) is provided to a decision step 1602 that tests whether a call for heat signal is true or is energized. If the call for heat signal is not energized, then a "no" output signal is generated at decision step 1602 and the decision step 1602 loops to again test whether the call for heat is energized. If the call for heat signal is energized, a "yes" output signal is generated. Similarly, in a logical or other fashion with decision step 1602, another decision step 1603 tests presence of whether the manual CFH ("Call for Heat") signal is true. If the manual CFH signal is not true, then a "no" output signal is generated at decision step 1603 and the decision step 1603 loops back and again tests for manual CFH signal. If the manual CFH signal is true, a "yes" output signal is generated at decision step 1603. The "yes" output signals from both the CFH signal energized at decision step 1602 and manual CFH signal at decision step 1603 are passed to a decision step 1604 that determines whether water flow rate is acceptable.

Referring again to FIG. 7, if the water flow acceptable decision step 1604 outputs a "no" signal, then a "watchdog" routine at step 1606 generates a water pump failed alarm signal. A "watchdog" routine is a computer software routine combined with sensor instrumentation that performs a timer action wherein multiple conditions are monitored. If the monitored conditions are not valid for more than the timer duration, then the watchdog times-out and an alarm is activated. In this specific case, an output signal from the watchdog routine at step 1606 that generates the water pump failed alarm is passed to a call command 1608 which calls the set alarms exist subroutine 1500 as best seen in FIG. 6. The program then proceeds to an end step 1610 since the set alarms exist subroutine 1500 will have been executed via a start set alarms exist step 1501. The start alarms exist step 1501 advances the program to the set alarms exists command 1313 where the program proceeds as previously described.

If the water flow acceptable decision step 1604 outputs a "yes" signal, then a set output to start blower VFD step is started at a step 1607 to facilitate combustion. The process then advances from the command step 1607 to a decision step 1609 to test whether a desired air flow is detected in burner 160. If desired air flow is not detected, then a "no" signal is output from decision step 1609. The "no" signal is received by a watchdog routine 1611. This watchdog routine 1611 generates a blower failed to start alarm signal that is passed to the previously mentioned call command 1608 where the program proceeds as previously described. However, if the output signal from the air flow detected decision step 1609 is "yes", then the "yes" output signal causes the program to advance to a command step 1615 that sets an output to start a liquid fuel pump. The liquid fuel may be oil or kerosene and is used to aid combustion. The output signal from command step 1615 is received at a command step 1617 that, in turn, causes the output to generate an output signal to enable a safety controller (not shown). The program then advances to a call step 1619 which calls the safety controller subroutine 1800 as best seen in FIG. 8. When the safety controller subroutine 1800 has completed its execution, the program will return to this point advancing to a decision step 1621 to determine whether the safety controller output signal is active as will be described hereinafter in greater detail.

Considering now the decision step 1621, when the safety controller subroutine 1800 has been successfully executed and a safety controller active signal is generated, the call safety controller command 1619 advances to the decision step 1621 via the return step 1815 enabling the program to advance. A safety controller active decision step 1621 tests whether the safety controller has started. If the output from safety controller active decision step 1621 is "no", then a watchdog routine at a step 1623 produces the safety failed to start alarm and the method of the intelligent control system 200 then advances to step 1625 and ends. On the other hand, if the output signal from safety controller active decision step 1621 is "yes", then an instruction is generated at a step 1627 to go to a step 1631. From step 1631, the program advances to a command step 1631 which initiates a burner startup timer (not shown). The system then proceed to a decision step 1633 to determine whether the delayed rotation of previously mentioned auger shaft 28 has elapsed for a predetermined time that is selected by the operator of burner 160. If output from decision step 1633 is "no", then decision step 1633 continuously loops and again tests whether the predetermined period of time has elapsed. If the time period has elapsed, then decision step 1633 passes a "yes" signal to a command step 1635 to set the output to "start rotation of auger shaft" routine at a step 1635. After the auger shaft 28 starts rotating, the start rotation of auger shaft routine step 1635 passes an output signal to a waste plastic fuel start decision step 1637 that determines whether plastic fuel feed has started to feed fuel along auger shaft 28 by means of previously mentioned auger plates 40. The decision step 1637 will cause the program to loop at this decision step until the waste plastic fuel feed starts. In this regard, when a "yes" signal is generated at decision step 1637, the system proceeds to a command step 1639 that sets the output to start the plastic feeder VFD modulus or subroutine.

Once the command step 1639 has been executed, the program proceeds to a command step 1641 which will set the plastic fuel feeder VHF speed to a "transition speed". The program then goes to a decision step 1643. At decision step 1643, a determination is made by the system as to whether a liquid fuel bypass time delay has ended. The time delay in starting the liquid fuel pump is provided to ensure that auger shaft 28 is in fact rotating before starting the liquid fuel pump. If the liquid fuel bypass time delay has not ended, then a "no" output signal is produced by decision step 1643. Decision step 1643 loops and then again tests whether liquid fuel bypass time delay has ended. If the liquid fuel bypass time delay has ended, the method of intelligent control system 200 executes a go to command step 1645 that advances the program to step 1647 as best seen in FIG. 8.

Referring to FIG. 8, after the liquid fuel time delay that is tested at decision step 1643 ends with a "yes" signal being generated, the program proceeds to a go to step 1645 that takes the routine to step 1647 as best seen in FIG. 8. From step 1647, the program goes to a command step 1649, which causes the system to set output to start a liquid fuel pump. However, operation of the liquid fuel pump is stopped at a command step 1651 after the liquid fuel pump is started at step 1649. Stopping the liquid fuel pump after starting the liquid fuel pump confirms that the liquid fuel pump is operational. An output signal from the stop liquid fuel pump step 1651 is provided to initiate a plastic fuel feeder variable frequency drive (VFD) motor at a command step 1653. The speed of the VFD motor is set to a predetermined "lean rate" for feeding the plastic fuel at a predetermined, lower non-operational rate. The plastic fuel is fed at the lean rate for a predetermined time selected by the operator of burner 160. During this time, the normal operating plastic fuel feed rate or "run rate" is delayed. The routine advances to a decision step 1655 that determines whether this time delay has ended before feeding the plastic fuel at the run rate. If the time delay for feeding the plastic fuel at the lean rate has ended, then the plastic fuel VFD motor speed is set to the operational "run" rate at command step 1702 via a go to step 1657 that advances the program to step 1700, from where the program proceeds to the command step 1702.

Referring again to FIG. 8, an output signal from step 1702 is provided to a decision step 1704 to determine whether there is a "call for heat". The call for heat is a PLC input point that is connected to a temperature switch, such as a thermostat. If the call for heat at decision step 1704 is true, then a "yes" output signal is generated. This "yes" output signal is provided to a decision step 1706 that determines whether an automatic stopping of a plant demonstration has completed. In this regard, operation of burner system 191 occasionally may need to be demonstrated to interested parties, such as government regulators, investors and members of the public. When demonstration of burner system 191 in an operating state is required, burner system 191 is run only for a predetermined time. The predetermined time is set for the time allowed for the demonstration. Therefore, burner system 191 is operated until decision step 1706 determines that the allotted demonstration time has elapsed. At that point, intelligent control system 200 automatically stops operation of burner system 191 if the demonstration time has elapsed by advancing to the stop heat command 1315 as best seen in FIG. 6.

Alternatively, if the call for heat at decision step 1704 is false, then a "no" output signal is generated. This "no" output signal is not provided to the "demonstration" decision step 1706. Rather, this "no" output signal is provided to previously mentioned stop heat step 1315.

Referring to FIGS. 4, 7 and 8, when the safety controller subroutine 1800 is called at the previously mentioned call step 1619 (see FIG. 6), the safety controller subroutine 1800 begins at a start routine step 1801. From the start step 1801, the operation of igniters 62, 190 (see FIG. 4) are initiated at a command step 1802, that produces an igniter output signal indicating that igniters 62, 190 are operating. It should be appreciated that the disclosure herein recites two igniters 62, 190; however, any number of suitable igniters may be used to initiate a flame. Next, the igniter output signals are received by an open liquid fuel solenoid (not shown) instruction at a command step 1804. The igniter output signal of step 1802 in combination with the open liquid fuel solenoid instruction from step 1804 are passed to a decision step 1806 to determine whether a flame is detected by an appropriate sensor 205 (see FIG. 4), such as an ultraviolet photoeye and amplifier board combination (not shown). The ultraviolet photoeye and amplifier board combination may be of a type, such as a "C7027A1023 ULTRAVIOLET MINIPEEPER FLAME SENSOR", that may be available from Honeywell International, Incorporated, located in Morristown, N.J., U.S.A. In this regard, the "C7027° A1023 ULTRAVIOLET MINIPEEPER FLAME SENSOR" is a compact flame detector for use with flame safeguard controls having ultraviolet amplifiers and detects ultraviolet radiation in flames. The "C7027A1023 ULTRAVIOLET MINIPEEPER FLAME SENSOR" is used with Honeywell Flame Safeguard primary safety controls for burners requiring ultraviolet flame detection. Suitable operation of igniters 62, 190 in combination with the proper operation of the liquid fuel solenoid should produce a flame. However, if the flame is not detected within a "flame proving" time period, then the safety controller turns off its "valve" output signals in order to close the liquid fuel valves and turns on its alarm output. If no flame is detected at decision step 1806, a "no" output signal is generated by decision step 1806. The "no" output signal generated by decision step 1806 is passed to decision step 1808 that tests whether the previously mentioned flame proving timing period has elapsed. If the output signal from decision step 1808 is "no", then the output signal from decision step 1808 is passed back to decision step 1806 and the presence of the flame is again tested. However, if the flame proving timing period has elapsed without presence of a flame, then decision step 1808 outputs a "yes" signal that is provided to a safety controller alarm at a step 1810. From the set safety controller alarm output step 1810, the program advances to the return step 1813, where the program proceeds as previously described.

Referring again to FIG. 8, if a flame is detected at decision step 1806, the decision step 1806 outputs a "yes" signal that is provided to a command step 1809 which sets a main valve out to enable solid fuel feed. Output from step 1809 is provided to a command step 1811 that sets a safety controller "active" input value that is supplied to previously mentioned return step 1813 which returns the program to step 1621 via step 1815 as described previously (see FIG. 7).

The pollution emission of one embodiment of the invention was tested by the KTL (Korean Testing Laboratory, located in Seoul, Korea) by measuring harmful gas emissions during the waste fuel burning. According to the tests, the dioxin level was 0.119 ng-TEQ/Sm3, the hydrogen chloride level was 0.78 ppm, and the sulfur oxides level was 6.60 ppm. Thus, these harmful gas emission levels were significantly below the Korean emission standard levels (dioxine: 5 ng-TEQ/Sm3, hydrogen chloride: 50 ppm, and sulfur oxides: 6.60 ppm), rendering the invention environmentally friendly.

The above description is illustrative and is not restrictive, and, as it will become apparent to those skilled in the art upon review of the disclosure, the present invention may be embodied in other specific forms without departing from the essential characteristics thereof. For example, while the above invention is described in conjunction with plastic waste fuel, the embodiments of the present invention can also be used with other solid fuels, waste or not, like, for example, coal, saw dust, wood chips, or a mixture of solid fuels. Furthermore, while three combustion chambers are described, a different number of combustion chambers may be used. These other embodiments are intended to be included within the spirit and scope of the present invention. The scope of the invention should, therefore, be determined not with reference to the above description, but instead should be determined with reference to the following and pending claims along with their full scope of equivalents.

The invention claimed is:

1. An energy conversion system, comprising:
a plurality of concentrically arranged combustion chambers for passing incinerated waste plastic fuel along a generally S-shaped combustion path into a discharge section for thermally coupling the incinerated waste plastic fuel to a fluid material to facilitate an energy conversion process; and a single rotatable feed mechanism; wherein said plurality of combustion chambers include a first combustion chamber, a second combustion chamber, and a third combustion chamber for defining a combustion unit having a transition space between said first combustion chamber and said second combustion chamber and into said discharge section; wherein said single rotatable feed mechanism includes an elongated shaft having a lumen extending along its longitudinal length; and wherein said lumen is provided with a first set of orifices in the transition space between said first combustion chamber and said second combustion chamber, and a second set of orifices in said discharge section for facilitating the discharge of air into the transition space to accelerate the burning of the waste plastic fuel passing through said combustion unit.

2. The energy conversion system according to claim 1, wherein said plurality of combustion chambers are arranged concentrically around said single rotatable feed mechanism; and wherein the individual ones of said combustion chambers are in fluid communication with one another to facilitate forming said S-shaped combustion path.

3. The energy conversion system according to claim 2, further comprising:
an air chamber surrounding said plurality of combustion chambers to facilitate preheating combustion air delivered to said plurality of combustion chambers and to facilitate insulating said plurality of combustion chambers against thermal losses to the environment.

4. The energy conversion system according to claim 3, wherein said plurality of combustion chambers are arranged radially one after another so that said combustion unit has a reduced overall axial length in the direction of said variable speed conveyor screw.

5. The energy conversion system according to claim 1, further comprising:
an air chamber surrounding said plurality of combustion chambers to facilitate preheating combustion air delivered to said plurality of combustion chambers and to facilitate insulating said plurality of combustion chambers against thermal losses to the environment; and wherein said fluid material is contained within a boiler in fluid communication with said plurality of combustion chambers for heating said fluid material to facilitate the energy conversion process.

6. The energy conversion system according to claim 5, further comprising:
an intelligent control system adapted to control operating parameters of said boiler including pressure, temperature and fluid level and for activating an emergency stop alarm if any one of the operating parameters of said boiler is outside a predetermined range of operating values.

7. The energy conversion system according to claim 1, wherein said lumen is further provided with a third set of orifices in said transition space between said first combustion chamber and said second combustion chamber.

8. The energy conversion system according to claim 1, wherein said lumen is further provided with a third set of orifices in said discharge section.

\* \* \* \* \*